United States Patent Office 3,028,356

Patented Apr. 3, 1962

3,028,356

VULCANIZATION OF BUTYL RUBBER WITH 3,5-DIALKYL PHENOL-ALDEHYDE HEAT REACTIVE RESINS

Alvin F. Shepard, Le Roy, N.Y., assignor to Hooker Chemical Corporation, Niagara Falls, N.Y., a corporation of New York No Drawing. Filed Sept. 8, 1958, Ser. No. 759,439

12 Claims. (Cl. 260—43)

This invention relates to a new method of vulcanizing Butyl rubber. Said new method of vulcanization is accomplished by reacting the Butyl rubber with a vulcanizing agent which is a heat reactive resin formed by reacting at least 1.2 moles of an aldehyde with a mole of a phenol of the general formula:

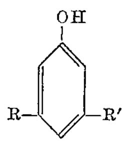

wherein R and R′ are lower alkyl groups containing collectively a total of at least four carbon atoms.

The concept of vulcanization discussed herein means the change of the Butyl rubber from its raw, tacky state into a non-tacky elastic material.

Butyl rubber is a generic name applied to vulcanizable elastic copolymers of isobutylene and small amounts of diolefins, such as isoprene or butadiene. For instance, as is disclosed in U.S. Patent 2,702,287, the term "Butyl rubber" encompasses vulcanizable rubbery copolymers of isobutene and about 0.5–10% of conjugated diolefins containing 4 through 6 inclusive carbon atoms.

Among the phenols falling within the foregoing defined formula are 3,5-diisopropyl phenol, 3,5-diethyl phenol, 3-methyl-5-isopropyl phenol, and 3,5-dibutyl phenol.

Among the aldehyde compounds reacted with the phenolic materials are formaldehyde, benzaldehyde, crotonaldehyde, furfural and acetaldehyde.

It is an object of this invention to provide a new method for vulcanizing Butyl rubber. It is a further object of this invention to form new Butyl rubber vulcanizates. It is an additional object of this invention to provide a method for vulcanizing Butyl rubber, which method is a rapid, efficient one and one which does not entail the use or need of extraneous acidic additives, such as accelerators, etc.

There are two general methods of curing Butyl rubber. One is the use of sulfur and accelerators. The second is the use of compounds such as 2,6-dimethylol-4-octylphenol and resins derived from such compounds.

Both these methods suffer from practical disadvantages. The sulfur cure leaves the Butyl rubber containing small amounts of free sulfur and/or sulfur derivatives and this free sulfur or sulfur derivative may oxidize to corrosive sulfur acids or may attack materials used in conjunction with the rubber article. Also when uncombined sulfur is present in rubber compositions it may subsequently "bloom" to the surface of the cured article thereby impairing its appearance.

The use of phenolic curing agents of the type mentioned avoids the disadvantages of sulfur which have been recited. In addition, by the use of phenolic curing agents of the above type, it is possible to obtain cured Butyl rubber stocks having outstanding resistance to heat and to oxidation. The chief disadvantages of the above phenolic cure are that the phenolic agent either requires an impractically long cure or that an acidic accelerator, such as, for example, ferric chloride, stannous chloride, chlorosulfonated polyethylene, chloroprene polymer, brominated Butyl rubber and the like must be used to obtain practical cure speeds.

Acid materials, such as ferric chloride, are undesirable in many types of Butyl rubber articles. Such acidic materials attack and degrade conventional fibrous fillers such as nylon, cellulose, steel wire, etc. Additionally acids attack steel molds, resulting in sticking and staining and the acids may later attack other objects with which the finished rubber parts come in contact.

It is the finding of this invention that vulcanizing agents which are 3,5-disurbstituted phenol-aldehyde resins formed by reacting at least 1.2 moles of aldehyde with one mole of a phenol of the general formula:

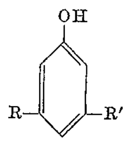

wherein R and R′ are lower alkyl groups, containing collectively a total of at least four carbon atoms, may be used to vulcanize Butyl rubber and that such vulcanization may be accomplished in a rapid, efficient manner without the employment of extraneous acidic additives such as ferric chloride, etc.

The following example illustrates the detailed preparation of a specific resinous vulcanizing agent embraced within the teachings of this invention:

EXAMPLE I

*The Preparation of a Resinous Vulcanizing Agent Based on 3,5-Diisopropyl Phenol and Formaldehyde*

Sixteen hundred and forty (1640) grams of 3,5-diisopropyl phenol, melting point fifty-five degrees centigrade, melted and mixed with ten hundred and sixty-seven grams of thirty-seven percent formaldehyde. The temperature of the mixture was adjusted to sixty degrees centigrade and a solution of 16.4 grams sodium hydroxide and forty grams water was added, keeping the mixture temperature below sixty degrees centigrade. The mixture was then reacted at sixty to seventy degrees centigrade for four hours until its free formaldehyde content was reduced to about one percent. The product was then dehydrated in vacuum to yield about eighteen hundred and thirty grams of a clear heat-reactive resin having an approximate melting point of forty-eight degrees centigrade.

This vulcanizing resin was tested for its effectiveness in Butyl rubber, as also were two other phenolic resins not embraced within the teachings of this invention, in order to compare their effectiveness and also to demonstrate the criticality of this invention. The following Butyl rubber formulation was used, wherein Butyl 325 is a commercial vulcanizable elastic copolymer of isobutylene and a small amount of isoprene, said copolymer containing 2.1 to 2.5 mole percent unsaturation which corresponds to about three weight percent of isoprene:

| | Parts by weight |
|---|---|
| Butyl 325 | 100 |
| High abrasion furnace black | 50 |
| Stearic acid | 1 |
| Phenolic derivative | 10 |

After mixing in the usual manner the mixtures were cured for varying lengths of time at three hundred and twenty degrees Fahrenheit to give products with the properties indicated in the table which follows:

TABLE I

| Phenolic Derivative | Ten Minutes' Cure | | | Twenty Minutes' Cure | | | Forty Minutes' Cure | | |
|---|---|---|---|---|---|---|---|---|---|
| | Tensile, p.s.i. | Modulus, 200% | Hardness, Shore A | Tensile, p.s.i. | Modulus, 200% | Hardness, Shore A | Tensile, p.s.i. | Modulus, 200% | Hardness, Shore A |
| Vulcanizing Resin of Example I | 700 | 120 | 54 | 1,210 | 280 | 60 | 1,800 | 400 | 63 |
| Commercial 2, 6-Dimethylol-4-alkyl phenol Resin | 330 | 110 | 49 | 880 | 120 | 57 | 1,000 | 300 | 63 |
| Commercial 2, 6-Dimethylol-4-octyl phenol Resin | 120 | 100 | 51 | 440 | 140 | 56 | 1,390 | 320 | 64 |

The foregoing results show that when the heat reactive vulcanizing resins of this invention are used to cure Butyl rubber, the Butyl rubber attains higher tensile, modulus and hardness in a given cure time than is attained when employing commercial vulcanizing agents of the prior art.

It is to be understood that the invention is not limited to the specific examples which have been offered merely as illustrative and that modifications may be made within the scope of the appended claims without departing from the spirit of the invention.

I claim:

1. A vulcanized material comprising the reaction product between a vulcanizable rubbery copolymer of isobutene and about 0.5–10% of a conjugated diolefin containing 4 through 6 inclusive carbon atoms and a vulcanizing agent which is the heat-reactive resinous reaction product of at least 1.2 moles of aldehyde per mole of a phenol of the general formula:

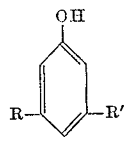

wherein R and R' are lower alkyl groups containing collectively a total of at least four carbon atoms.

2. A vulcanized material comprising the reaction product between a vulcanizable rubbery copolymer of isobutene and about 0.5–10% of a conjugated diolefin containing 4 through 6 inclusive carbon atoms and a vulcanizing agent which is the heat-reactive resinous reaction product of at least 1.2 moles of aldehyde selected from the group consisting of formaldehyde, benzaldehyde, crotonaldehyde, furfural and acetaldehyde per mol of phenol selected from the group consisting of 3,5-diisopropyl phenol, 3,5-diethyl phenol, 3-methyl-5-isopropyl phenol and 3,5-dibutyl phenol.

3. A vulcanized material comprising the reaction product between a vulcanizable rubbery copolymer of isobutene and about 0.5–10% of a conjugated diolfin containing 4 through 6 inclusive carbon atoms and a vulcanizing agent which is the heat-reactive resinous reaction product of at least 1.2 moles of formaldehyde per mol of 3,5-diisopropyl phenol.

4. A method of vulcanizing a vulcanizable rubbery copolymer of isobutene and about 0.5–10% of a conjugated diolefin containing 4 through 6 inclusive carbon atoms which comprises the steps of intimately admixing in the polymer a vulcanizing agent which is the heat-reactive resinous reaction product of at least 1.2 moles of aldehyde per mol of a phenol of the general formula:

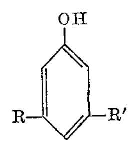

wherein R and R' are lower alkyl groups containing collectively a total of at least four carbon atoms and vulcanizing the resulting admixture by heating to a vulcanizing temperature.

5. A method of vulcanizing a vulcanizable rubbery copolymer of isobutene and about 0.5–10% of a conjugated diolefin containing 4 through 6 inclusive carbon atoms which comprises the steps of intimately admixing in the polymer a vulcanizing agent which is the heat-reactive resinous reaction product of at least 1.2 moles of aldehyde selected from the group consisting of formaldehyde, benzaldehyde, crotonaldehyde, furfural and acetaldehyde, per mol of phenol selected from the group consisting of 3,5-diisopropyl phenol, 3,5-diethyl phenol, 3-methyl-5-isopropyl phenol and 3,5-dibutyl phenol and vulcanizing the resulting admixture by heating to a vulcanizing temperature.

6. A method of vulcanizing a vulcanizable rubbery copolymer of isobutene and about 0.5–10% of a conjugated diolefin containing 4 through 6 inclusive carbon atoms which comprises the steps of intimately admixing in the polymer a vulcanizing agent which is the heat-reactive resinous reaction product of at least 1.2 moles of formaldehyde per mol of 3,5-diisopropyl phenol and vulcanizing the resulting admixture by heating to a vulcanizing temperature.

7. The vulcanized material of claim 1 wherein the vulcanizable rubbery copolymer is a copolymer of isobutene and a conjugated diolefin selected from the group consisting of isoprene and butadiene.

8. The vulcanized material of claim 2 wherein the vulcanizable rubbery copolymer is a copolymer of isobutene and a conjugated diolefin selected from the group consisting of isoprene and butadiene.

9. The vulcanized material of claim 3 wherein the vulcanizable rubbery copolymer is a copolymer of isobutene and a conjugated diolefin selected from the group consisting of isoprene and butadiene.

10. The method of claim 4 wherein the vulcanizable rubbery copolymer is a copolymer of isobutene and a conjugated diolefin selected from the group consisting of isoprene and butadiene.

11. The method of claim 5 wherein the vulcanizable rubbery copolymer is a copolymer of isobutene and a conjugated diolefin selected from the group consisting of isoprene and butadiene.

12. The method of claim 6 wherein the vulcanizable rubbery copolymer is a copolymer of isobutene and a conjugated diolefin selected from the group consisting of isoprene and butadiene.

References Cited in the file of this patent

UNITED STATES PATENTS

| | | |
|---|---|---|
| 2,211,048 | Bitterich | Aug. 13, 1940 |
| 2,702,287 | Iknayan et al. | Feb. 15, 1955 |
| 2,732,368 | Shepard | Jan. 24, 1956 |
| 2,808,445 | D'Amico | Oct. 1, 1957 |
| 2,898,321 | Shepard | Aug. 4, 1959 |
| 2,898,322 | Shepard | Aug. 4, 1959 |

OTHER REFERENCES

Rehner et al.: "Vulcanization Reactions in Butyl Rubber," Ind. Eng. Chem., volume 38, No. 5, May 1946, pages 500–506, page 500 relied on.